United States Patent [19]

Bione

[11] Patent Number: 5,533,202
[45] Date of Patent: Jul. 2, 1996

[54] APPARATUS USING A BINARY CODED DECIMAL SWITCH AND A PROGRAMMABLE LOGIC ARRAY FOR SELECTIVELY COUPLING TERMINALS OF A CONTROLLER CHIP TO DATA BUS LINES

[75] Inventor: Angelo A. Bione, Elmhurst, Ill.

[73] Assignee: Zenith Electronics Corporation, Glewview, Ill.

[21] Appl. No.: 970,318

[22] Filed: Nov. 2, 1992

[51] Int. Cl.$^6$ .................................................. G06F 3/02
[52] U.S. Cl. .................... 395/280; 395/828; 200/11 R; 326/38; 326/39; 364/238.2
[58] Field of Search .............................. 370/85.1, 110.1, 370/67, 87, 91; 395/200, 275, 325, 280, 828; 341/85, 55; 340/825.75; 137/1; 200/11 R; 326/3 P, 39

[56] References Cited

U.S. PATENT DOCUMENTS

| | | | |
|---|---|---|---|
| 3,649,822 | 3/1972 | Mersteh | 341/85 |
| 3,882,466 | 5/1975 | Poorvin | 340/825.75 |
| 4,547,880 | 10/1985 | De Vita et al. | 370/91 |
| 4,745,597 | 5/1988 | Morgan et al. | 370/87 |
| 4,787,029 | 11/1988 | Khan | 395/325 |
| 5,217,035 | 6/1993 | Van Marcke | 137/1 |
| 5,315,300 | 5/1994 | Schumidt | 341/55 |

Primary Examiner—Thomas C. Lee
Assistant Examiner—Le Hien Luu

[57] ABSTRACT

A network interface card for a personal computer includes a controller chip and a programmable logic array that is coupled at its output terminals to the bus pull-up resistors, or to dedicated terminals of the controller chip for establishing different configurations for the controller chip on the interface card. A rotary, ten position binary coded decimal switch is coupled across the inputs of the programmable logic array. Each position of the switch establishes a different configuration for the controller. The arrangement eliminates the need for manual switches and movable jumpers for configuring the network interface card controller chip.

6 Claims, 2 Drawing Sheets

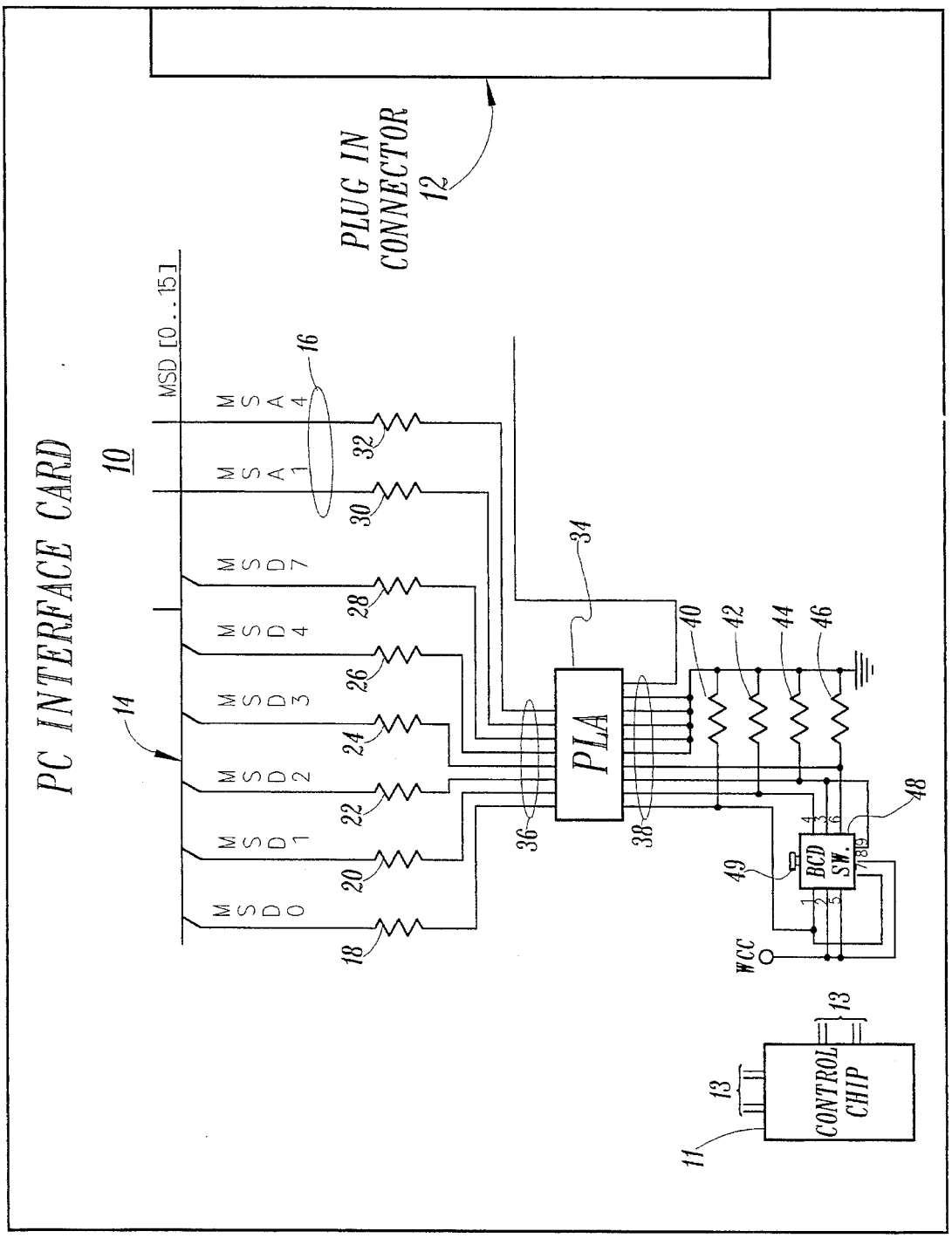

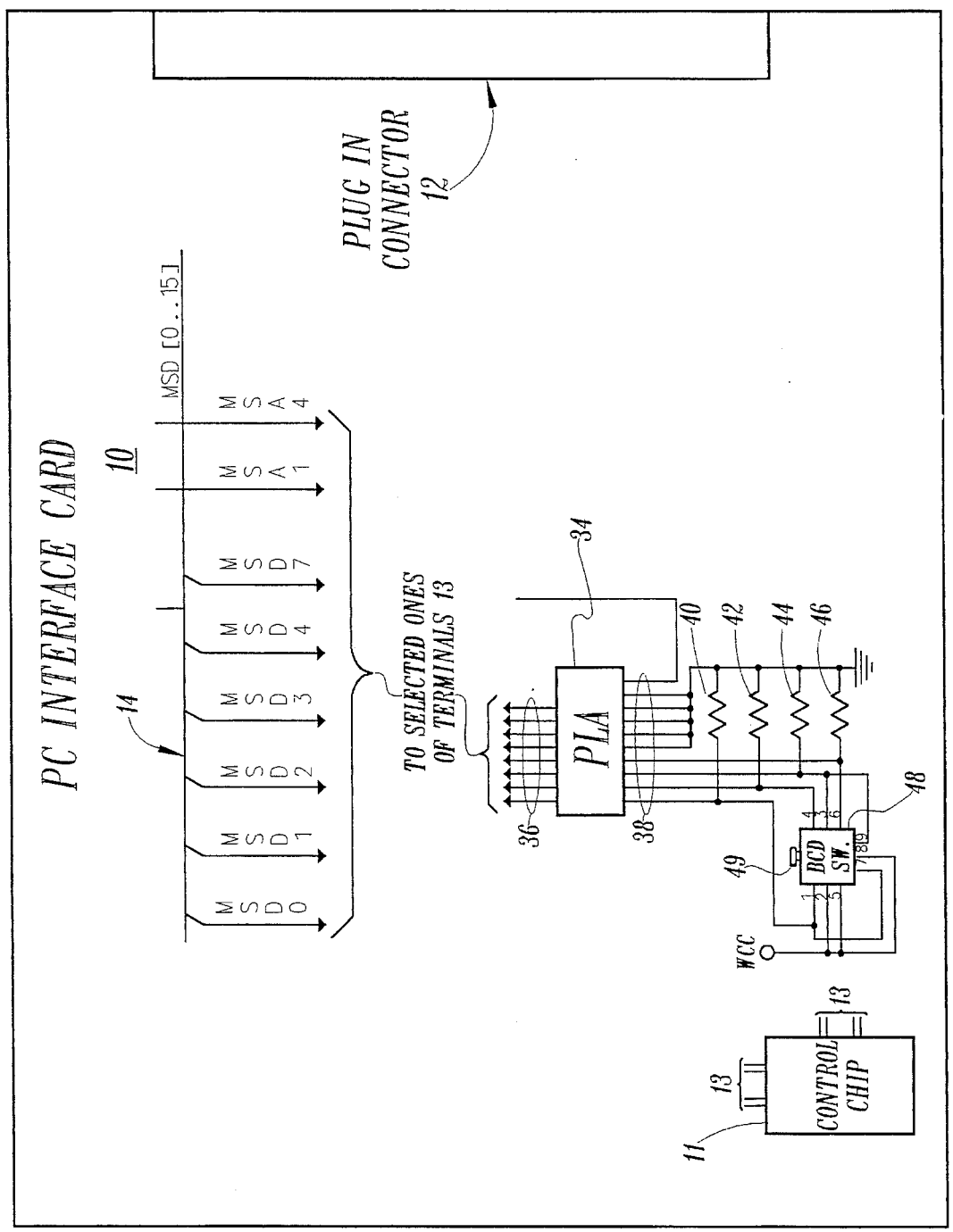

APPARATUS USING A BINARY CODED DECIMAL SWITCH AND A PROGRAMMABLE LOGIC ARRAY FOR SELECTIVELY COUPLING TERMINALS OF A CONTROLLER CHIP TO DATA BUS LINES

BACKGROUND OF THE INVENTION AND PRIOR ART

This invention relates in general to personal computers (PC's) and in particular to personal computers that are part of local area networks (LAN's). One of the difficulties in using prior art personal computers is that the user must manually adjust or set a plurality of mechanical connection devices, such as dual in-line pin (DIP) switches and wire jumpers, in various ways to properly configure the controller chip for operation on the particular LAN with which the PC is interfacing. The mechanical adjustments or settings of the switches and jumpers connect to various bus pull-up resistors (or directly to dedicated terminals of the chips) for establishing the proper voltages for the controller chip, which is thereby configured to establish the desired operating characteristics for the network interface card.

By way of explanation, but without limitation, the particular interface card may be used to configure the LAN network interface and controller chip for establishing PC operating conditions such as the Interrupt Line, the I/O (input/output) base potential, the I/O memory condition and a boot prom arrangement where the PC terminal itself is booted up from the LAN. The various settings to accomplish the above are normally performed by the user when the network interface card is installed and are accomplished by manually operating various DIP switches and/or physically moving wire jumpers on the interface card.

The present invention eliminates the need for manual operations of such mechanical connection devices when configuring the network interface card controller.

OBJECTS OF THE INVENTION

A principal object of the invention is to provide a novel network interfacing card for a LAN.

Another object of the invention is to provide a network interfacing card for a PC LAN that is readily configured for different LAN operating environments.

BRIEF DESCRIPTION OF THE DRAWINGS

These and other objects and advantages of the invention will be apparent upon reading the following description in conjunction with the drawings, in which:

FIG. 1 is a partial block diagram illustrating the invention used with a controller chip having pull-up resistors; and FIG. 2 is a similar diagram illustrating a controller chip with dedicated terminals that are connected to the buses during configuration.

DESCRIPTION OF THE PREFERRED EMBODIMENT

Referring to FIG. 1 of the drawings, a PC interface card 10 is indicated by the large rectangle and includes a controller chip 11 and a plug-in connector 12. Controller chip 11 has a plurality of terminals or connections 13 and is connected to devices on the interface card 10 for performing various functions and for establishing different operating conditions. These devices and functions are well known in the art and are not illustrated since they form no part of this invention. A pair of buses 14 and 16 are indicated with a plurality of bus lines (MSD0–MSD7 and MSA1, MSA4) connected to a corresponding plurality of bus pull-up resistors 18, 20, 22, 24, 26, 28, 30 and 32. A programmable logic array chip 34 has its output terminals 36 coupled to the bus pull-up resistors 18–32 and its input terminals 38 coupled to various ones of resistors 40, 42, 44 and 46 that are connected to the four line output of a multi position rotary binary coded decimal (BCD) switch 48. The BCD switch 48 is well known in the art for establishing binary coded output signals, developed from a voltage source VCC, as a function of switch position. The BCD outputs are developed across resistors 40–46. A control knob 49 is used to rotate the shaft mechanism of BCD switch 48 among its plurality of positions which establishes, in BCD format for the inputs of programmable logic array 34, the different configurations for the controller 11 in the network interface card 10. In the preferred embodiment of the invention, BCD rotary switch 48 has 10 positions although 16 positions are feasible for the four binary coded outputs used.

In FIG. 2, both the various bus lines MSD0–MSD7, etc. and the output terminals 36 of programmable logic array 34 are connected directly to various ones of dedicated terminals 13 on the controller chip. Thus no pull-up resistors are required. Rather, configuration of the controller chip 11 is accomplished by programmable logic array 34 selectively connecting the terminals 13 on controller chip 11 to the bus lines.

In operation, the network interface card includes instructions for the user to position BCD switch 48 among its various positions to establish certain predetermined desired operating characteristics for the interface card. Thus after installing the network interface card 10 in the PC terminal in the appropriate card slot via connector 12, the user need merely rotate BCD switch 48 until the desired configuration of controller chip 11 is obtained for proper functioning of the interface card 10 in the PC terminal and on the particular LAN. The prior art requirement of manually setting various switches (or relocating various jumpers on the board) is thus eliminated. In its place is a simple BCD switch that operates through the programmable logic array 34 to establish preprogrammed appropriate connections of the bus pull-up resistors (or connection of dedicated terminals on the controller chip) for the selected operating conditions.

It is recognized that numerous changes in the described embodiment of the invention will be apparent to those skilled in the art without departing from its true spirit and scope. The invention is to be limited only as defined in the claims.

What is claimed is:

1. In a PC network interface card of the type including a controller chip coupled to a plurality of data bus lines and a plurality of mechanical connection devices for configuring the controller chip for proper operation by manually setting said plurality of mechanical connection devices to selectively couple terminals of the controller chip to said plurality of data bus lines, the improvement comprising:

a programmable logic array in place of said plurality of mechanical connection devices, said programmable logic array having outputs coupled to the terminals of said controller chip and to said plurality of data bus lines for configuring said controller chip by selective connection of said controller chip terminals to said plurality of data bus lines; and a ten position binary coded decimal switch coupled across the input of said programmable logic array, said ten position binary coded decimal switch device developing a four bit binary coded decimal output for establishing a different configuration of said controller for each position thereof.

2. The interface card of claim 1, further including a plurality of pull-up resistors coupled between said plurality of data bus lines and said outputs of said programmable logic array.

3. In a PC network interface card of the type including a controller chip coupled to a plurality of data buses, a plurality of pull-up resistors and plurality of mechanical connection devices for configuring the controller chip for proper operation by manually setting said plurality of mechanical connection devices, the improvement comprising:

a programmable logic means in place of said plurality of mechanical connecting devices, said programmable logic means being coupled to said plurality of pull-up resistors and to said plurality of data buses for configuring said controller chip by selective connection of said plurality of pull-up resistors with said plurality of data buses;

a switch device for controlling said programmable logic means;

wherein said programmable logic means and comprises a programmable logic array having outputs coupled to said plurality of pull-up resistors and wherein said switch across is a multi-position binary coded decimal switch coupled across the input of said programmable logic array, said multi-position binary coded decimal switch establishing a different configuration of said controller chip for each position thereof.

4. The interface card of claim 3 wherein said multi position binary coded decimal switch has ten positions and develops a four bit binary coded decimal output.

5. In a PC network interface card of the type including a controller chip coupled to a plurality of data bus lines and a plurality of mechanical connection devices for configuring the controller chip for proper operation by manually setting said plurality of mechanical connection devices to selectively couple terminals of the controller chip to said plurality of data bus lines, the improvement comprising:

a programmable logic means in place of said plurality of mechanical connection devices, said programmable logic means being coupled to the terminals of said controller chip and to said plurality of data bus lines for configuring said controller chip by selective connection of said controller chip terminals to said plurality of data bus lines;

a switch device for controlling said programmable logic means;

a plurality of pull-up resistors coupled between said plurality of data bus lines and said programmable logic means;

said programmable logic means comprising a programmable logic array having outputs coupled to said plurality of pull-up resistors and wherein said switch device is a multi position binary coded decimal switch coupled across the input of said programmable logic array, said multi position binary coded decimal switch establishing a different configuration of said controller chip for each position thereof.

6. The interface card of claim 1 wherein said multi position binary coded decimal switch has ten positions and develops a four bit binary coded decimal output.

* * * * *